(12) United States Patent
Anders et al.

(10) Patent No.: US 7,102,509 B1
(45) Date of Patent: Sep. 5, 2006

(54) COMPUTER INTERFACE SYSTEM FOR TRACKING OF RADIO FREQUENCY IDENTIFICATION TAGS

(75) Inventors: Joseph Anders, Mobile, AL (US); Jeremy Birch, Mobile, AL (US); Bryan Wilson, Mobile, AL (US); Marty Logsdon, Mobile, AL (US)

(73) Assignee: Global Tel★Link Corporation, Mobile, AL (US)

( * ) Notice: Subject to any disclaimer, the term of this patent is extended or adjusted under 35 U.S.C. 154(b) by 190 days.

(21) Appl. No.: 10/754,254

(22) Filed: Jan. 9, 2004

Related U.S. Application Data

(60) Provisional application No. 60/439,777, filed on Jan. 11, 2003.

(51) Int. Cl.
*G08B 1/08* (2006.01)
*H04Q 7/00* (2006.01)

(52) U.S. Cl. ............... 340/539.13; 340/5.2; 340/539.1; 340/870.18; 379/38; 379/188; 455/234.1

(58) Field of Classification Search ................. 340/5.2, 340/539.1, 539.12, 870.18, 870.19, 870.24; 379/38, 188; 455/234.1
See application file for complete search history.

(56) References Cited

U.S. PATENT DOCUMENTS

| | | | | | |
|---|---|---|---|---|---|
| 4,885,571 | A | * | 12/1989 | Pauley et al. | ............ 340/573.4 |
| 5,255,306 | A | * | 10/1993 | Melton et al. | ................ 379/38 |
| 5,831,535 | A | * | 11/1998 | Reisman et al. | ......... 340/573.4 |
| 5,995,019 | A | * | 11/1999 | Chieu et al. | ............. 340/10.32 |
| 6,300,872 | B1 | * | 10/2001 | Mathias et al. | ............. 340/540 |
| 6,611,673 | B1 | * | 8/2003 | Bayley et al. | ............. 340/10.3 |

* cited by examiner

*Primary Examiner*—Jeffery Hofsass
*Assistant Examiner*—Samuel J. Walk
(74) *Attorney, Agent, or Firm*—Dority & Manning, P.A.

(57) ABSTRACT

A method for operating with multiple protocols for handling communications comprising the steps of obtaining information from sensors and related input devices utilizing specialized tamper resistant passive transceivers working with active pulse type transceivers to create historical maps of information on people or objects. This includes steps of: a) identifying recording information, b) sending and receiving prompts, c) associating the call with timers, d) monitoring passive transceivers with low level diagnostic information, e) monitoring the transceivers with voice recognition software, f) recording associated data, g) identifying the users, the key words or phrases within the recorded data, h) naming the recording and i) saving the data in a protected format.

16 Claims, 9 Drawing Sheets

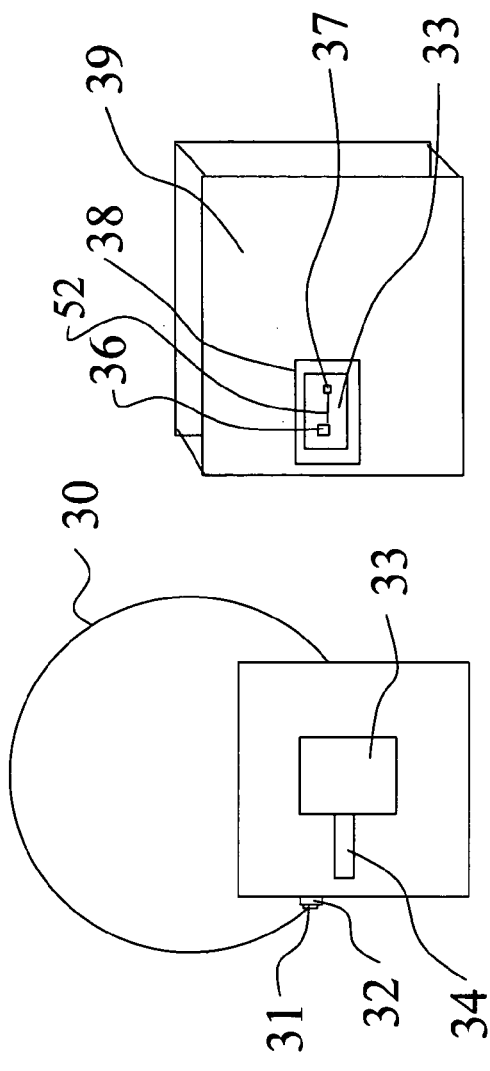
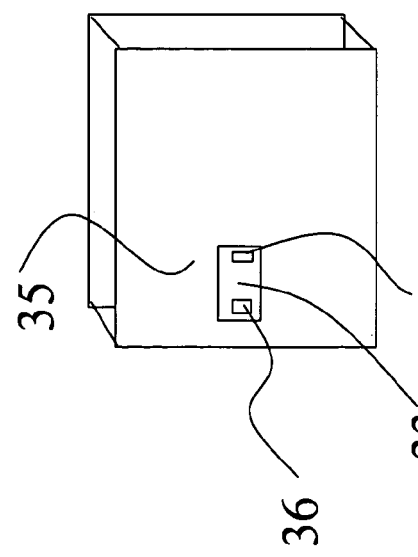
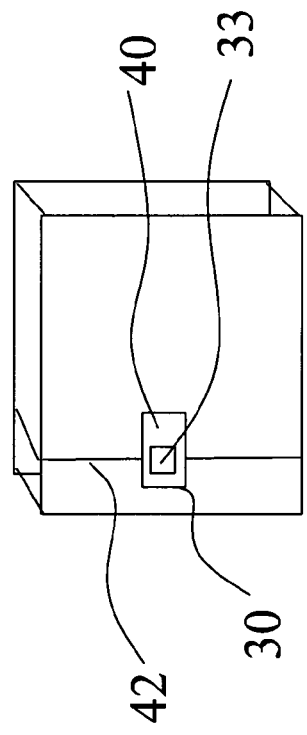

COMPUTER INTERFACE SYSTEM FOR TRACKING OF RADIO FREQUENCY IDENTIFICATION TAGS

PRIORITY STATEMENT

Patent claims priority of provisional patent no.:60/439,777 filed Jan. 11, 2003.

BACKGROUND OF INVENTION

1. Prior Art

Prior art shows the use of RFID (Radio Frequency Identification) tags utilized extensively in the prior art and in conjunction with monitoring devices over various areas.

Maloney; U.S. Pat. No. 6,427,913, shows the use of RFID tags on keys in order to monitor the use of keys over a predetermined area.

Examples of the use of this technology are fairly widespread including Curkendell, et al, U.S. Pat. No. 6,342,839 which shows the use of RFID tags retracting livestock and includes the storage of data in order to maintain the data which is consistent with the method taught in Maloney whereby information can be stored in order to determine authorized and unauthorized use.

Pruett; U.S. Pat. No. 6,263,440 shows the use of this technology for tracking computers.

Blackenship et al; U.S. Pat. No. 6,267,291 shows the use of RFID codes to control a manufacturing process.

Ohanian, et al; U.S. Pat. No. 6,390,208 shows the use of RFID tags in order to track tax paperwork.

Two additional patents of Pruett U.S. Pat. No. 6,170,059 and U.S. Pat. No. 6,154,790 both show the use of tracking modules in different embodiments for following computer elements.

Mufti, et al, U.S. Pat. No. 5,363,425 shows the use of ID badges used in conjunction with RF transmitters to receiver units located across telephone networks with the receiver units in or near telephone sets for purposes of tracking a user wearing an ID badge containing an RF transmitter.

Sims, et al, U.S. Pat. No. 5,434,775 shows the use of tracking devices which are also associated with equipment conditioned as well as location.

Flies, et al; U.S. Pat. No. 4,578,573, shows the lot for use of conductive pathways between conductive areas on a circuit board.

Fridden, U.S. Pat. No. 6,144,301; shows the use of an RFID transponder within the body of an asset or attached to the body of an asset with flexible straps for identifying and tracking products.

Maloney; U.S. Pat. No. 6,204,764 shows the use of RFID tags attached to objects which tags having antennaes which are activated to transmit a unique code identifying the object. The radio frequency transmissions can be through compasitative coupling or industrial loops for conveying the transmission though inductive couplings. Computer based controllers identified which couple through the antennae receptacle for receiving transmitter codes and determining the presence and location of objects within storage units.

Black; U.S. Pat. No. 5,910,776 shows the use of RFID readers and RFID transponders in order to track equipment to identify, locate, and monitor equipment and other object.

Brady; U.S. Pat. No. 6,249,227 shows RFID technology used for inventory tracking and short distance communication between assets. It shows the use of integration of the RFID components at different levels into the products to be monitored.

Welch, et al; U.S. Pat. No. 5,319,363; shows the use of RFID transponders activated by use or non-use of particular medical devices and Maloney, U.S. Pat. No. 6,474,665 shows the use of RFID transponders for tracking removable objects from a location and determining the presence or absence of objects within certain location.

Foster; U.S. Pat. No. 5,287,414 shows the use of machine readable indicia in cabinets which are scanned by a reader in the cabinet.

Some of the patents showing the controls of signal strength in transmission are shown in Lemson U.S. Pat. No. 5,321,849; Lawlor U.S. Pat. No. 5,220,501 which shows the connection between terminals in a central computer over a dial up telephone lines and packet data networks and Sasaki, U.S. Pat. No. 4,553,105 shows a level detector which detects the level of the input or output signal for dealing with signal strengths over a wide range.

Thro; U.S. Pat. No. 4,619,002 shows another method of calibrating strength of signals to a microprocessor.

Riordan U.S. Pat. No. 5,184,349 shows a method of controlling the amplitude of random burst signals in a time hash division of multiple access communication system and controls amplitude of signal bursts utilizing time dependant methods.

2. General Discussion of the Invention

The prior art fails to provide for tracking where large numbers of radio frequency (rf) signals are tracked within human populations. It also does not provide a method for tracking where powered transceivers are impractical over large areas. There is also a failure of the prior art to apply the technology of tracking to changing areas, tracking typically being done is static environments.

The present invention taught in this specification would allow movements within a facility to be tracked and documented. It would also allow tracking outside of a set environment to alternate environments, even homes.

Inmates in a prison system are specifically tracked in this invention. These inmates would be issued a hospital type wrist band that, when clamped on the wrist completes a circuit. Products could be labeled with a band which could fit over a seal. Completing this circuit enables a chip embedded in the band to respond with an identification number every time a radio beam is sent to the band.

The user would install transponders (transmitters and receivers in one) at spaced intervals in, for example, a jail/prison facility. These transmitters would be programmed to send out a pulse at a set and/or configurable amount of time. The bands, having passing transceivers described in more detail below in each area will response. These responses and their location will be entered into a database. The responses will be compared against the inmate population expected to be within the confines of the jail/prison area. If a response is not received from every inmate in the system, the missing inmate's ID will be alerted in a manner which is user configurable through the systems interface. An alert may appear on the screen or utilize expanded alerting function for other alert methods and can all be combined or used individually or grouped; which are set by the user as described in more detail below.

The user interface would have a floor plan diagram of the facility and would allow for searches much like our current web based inmate monitoring and control system. Utilizing our system, the facility would be able to immediately locate any inmate in the facility. Additionally, the facility would be able to perform flexible searches based on the time and date, user ID, area numbers assigned by the facility, or many other criteria that can be customized for a friendlier interface that is intuitive and informative. In other words, the end user could set the search up to show the movements of an inmate with ID number 1004 for the last two (2) days. The result would be a detailed track of where the inmate had started and finished within the scope of the query requested. An example would be a dot moving around on the screen with the date and time shown at each dot where there was a recorded time interval. Coding could be done with progressive color searches as by going from light to dark, green to yellow to red as a particular time is approached. Another search could identify every inmate in a particular area in a given time span or in real time. Thus, an officer could identify the inmates in the area should an incident occur for investigation or for tracking of the population determining usage of areas or for use in conjunction with other systems. An example of this later use would be the inmate location with a pin code so phone could ensure a particular inmate was using a particular PIN number before authorizing a call.

In addition, as the inmate moved through various areas, the software through a centralized computer could reprogram the tracking so that inmates could be tracked at the new locations and to confirm arrival. Through the use of the local and corresponding remote central procession units updating one another, enhanced tracking would be possible. Using comparison software, signals from bracelets not expected to be present could be selected, identified and irregularities cleared up.

The bands would be so configured as to become disabled if removed (by breaking the band), thus creating an alarm on the inmate whose tag did not respond.

Another aspect of the invention is directed to a telephone apparatus for communicating telephones located at a facility with the PSTN. A phone system is located at the facility, including switching means for connecting the telephones with the PSTN. Access control data is provided which includes phone-related data and PIN number-related data. Control means actuates the switching means in accordance with the access control data. A computerized central office is located remotely from the facility. A computer workstation is located at the facility along with a computer file server, a computerized recording system and means for communicating the central office, workstation, file server and recording system.

Yet another aspect of the invention is directed to a telephone apparatus for controlling access by telephones located at a facility to the PSTN and recording selected phone conversations. Means is provided for storing access control data and recoding control data. Call-related data particular to an attempted call being made form one of the telephones is provided. A phone system is located at the facility, including access control means for providing selected access from the one telephone to the PSTN by connecting the attempted call based on a comparison of the access control data with the call-related data. Recording means is coupled to the phone system for recording conversation data generated when an attempted call has been connected to the PSTN. Recording control means selects which connected calls are to be recorded based on a comparison of the call-related data with the recording control data. Storage means (typically hard drives and ram) stores the conversation data of connected calls selected to be recorded.

It is therefore an object of the invention to provide a passive device to send a radio frequency (RF) signal in response to a signal from a sensor (transceiver) with or without telephones monitoring a system an individual or object and associating the marker with a pin number or other data. Call information or monitored information may be stored with data on the passive device of location relative to sensor with or without other data.

It is an additional object of the invention to provide a transceiver phone system with an interface means for connection to a CPU means for receiving storing information from a group of information comprised of individuals present, location, the locations from and to which the call or monitoring is made, the name or the maker, time when made and when finished, data fo the call, telephone numbers (to where the call is made) and inmate location.

It is an additional object of the invention to convert the monitored data to a digital format for storage and to maintain a database of data, voices or sounds in a digital format, particularly secondary ring signals, and to compare the digital database of voice or sounds or data (particularly phone numbers, names, addresses and are codes) based on user controlled degrees of similarity and to take different actions from a group of actions including alerting, locking in, generating visual or audible alarms, monitoring, marking, terminating or playing a recording before, after or in conjunction with the ongoing call based on a sensor location.

It is a further object of the invention to encode the information in a format providing that any alteration of the data will result in a mark showing the data has been altered.

It is a further object to allow for data to be selected, stored or played back to be altered at a graphical user interface, such as a keyboard type entry with a graphic format showing location.

Another object of the invention is to facilitate the use of a phone system located at a facility to record phone conversations originating from any of its telephones.

Another object of the invention is to facilitate the selected retrieval of phone conversations recorded by the phone system.

A further object of the invention is to control access by individual users to areas based on a run usage and RF signals associated with the individuals.

Yet another object of the invention is to control the recording of phone conversations based on the identity of individual telephone users.

These and other objects of the invention are attained in accordance with one aspect of the invention which is directed to a telephone system for communicating telephones located at a facility with a public switched telephone network (PSTN). A switching means connects the telephones with the PSTN. Access control data is provided which includes phone-related data and PIN number-related data. Control means actuates the switching means in accordance with the access control.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

FIG. 3 shows a close up of a monitoring bracelet with a passive transceiver.

FIG. 4 shows a mounting mechanism for a package having two sides with a mounting transceiver.

FIG. 5 shows an alternate embodiment of the packaging shown in FIG. 4 for metallic objects.

FIG. 6 shows the use a seal used in conjunction with the transceiver of the type taught in FIG. 4.

DETAILED DESCRIPTION OF THE PREFERRED EMBODIMENT

Figure 1:
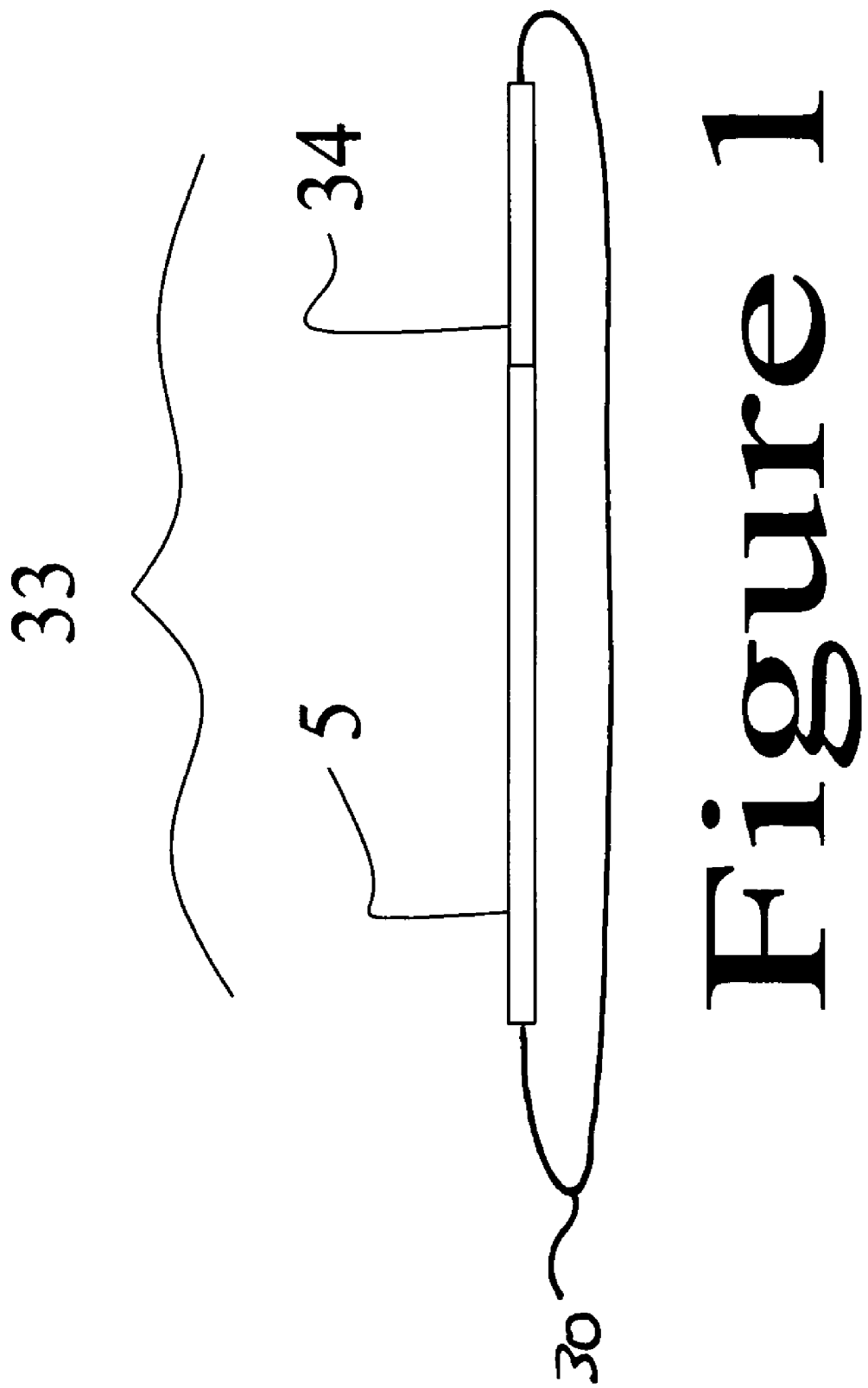
FIG. 1 shows the interaction of a passive ID device with a special transceiver used in conjunction with a phone system.

As can best be seen by reference to FIG. 1, an actual passive device 33 used in the preferred embodiment is nearly flat and less than 1 inch square. The device size allows it to be integrated into almost anything. It consists of a micro transceiver 5 and an antennae 34 of a type known in the prior art since they are not powered, they rely on a pulse from a transmitter on a transceiver 12 to generate power for a response signal.

Figure 2:
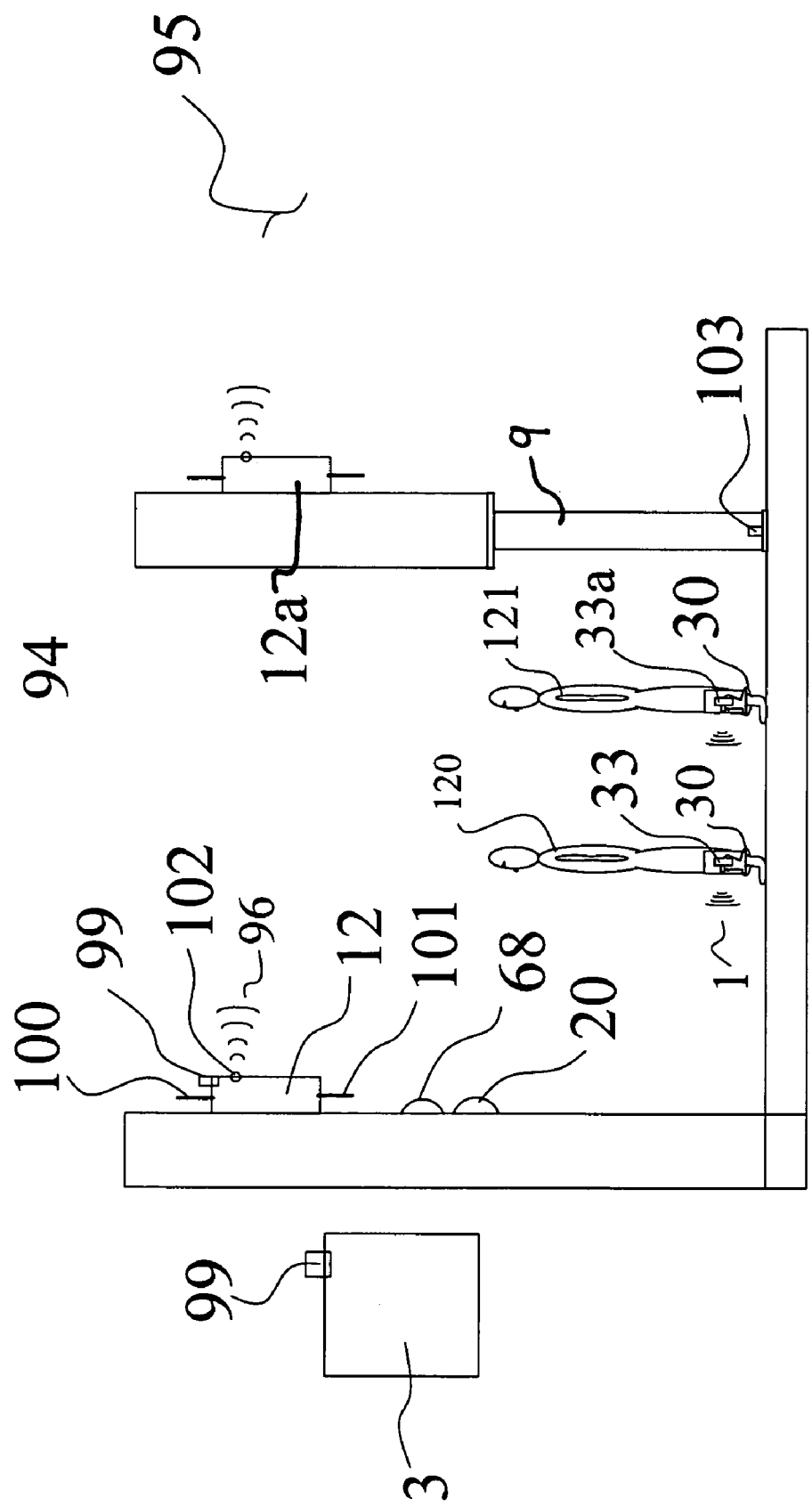
FIG. 2 represents a possible antenna solution that tracks appropriately tuned passive devices.

FIG. 2 shows a possible transceivers-passive device 33 antenna solutions that tracks appropriately tuned passive devices. The passive devices can be mounted discretely and hidden to the point to where they are almost undetectable. They can, for example, be run in the seams of clothing. In FIG. 2 they are shown as a bracelet around the ankle although a hospital wrist type bracelet would work as well.

This invention has the following general parameters:

a) use of passive transmitters to track objects within defined spaces;

b) modified passive transmitters to provide for tamper proof use;

c) response systems (electronic notice, notification, active input-alarm, lock-in, notification etc.) used in conjunction with reports received from active transponders used in conjunction with a computer system and in conjunction with historical maping;

d) use of specialized phone systems to interface and be used in conjunction with or enhance the feature list c. (e.g. having phones go off hook, send video signals, etc.) when people or objects with passive device transmitters pass the RFID scanning devices within the confines of the facility or at selected exterior areas where devices can be utilized in order to provide monitoring information to the end users. Any and all of these features are configurable within the specification of the current available system provided and additional features can be added to accommodate user requests;

e) different specialized use situations: prison systems, movement of objects or merchandise, retail use, luggage tracking, factory settings, etc;

f) historical record keeping and tracking utilizing computer databases and blueprint style layouts having models reflecting the floor plans of the facility where the device is used. Searches on specific individuals, groups (a set of individuals assigned to a user configurable ID or catalogue), or regions of a facility can be performed using multiple filters in order to show movement through a facility and visited locations both real time and historical data;

g) specialized passive receivers (e.g. circuit having special signal until bracelet broken by inmate, or persons/objects being tracked, etc.);

h) specialized transceivers (e.g. sensors built in to predetermined or determinable locations;

i) checking for interference before sending pulses as provided by the RFID technology, etc.) thereby providing assurance of signal and data accuracy; and j) tieing in this system with other cooperating systems (door locks, etc.).

The invention has several elements which are necessary in order to practice it.

One of those is a physically attached device which is in the form of a passive device 33; a transponder means (FIG. 2) for generating an identifiable response signal in response to a signal from transceiver 12 based on a numerically or alphanumerically encoded passive device 33 attached to the individual or object which is read and identified by the scanning device (transceiver 12).

The scanning device 33 reports back the code detected on the person or object and returns the information to a database which is accessible by the end user through an interface. The interface and data system can identify who or what has passed the transceiver 12 and records the data for retrieval.

The passive device 33 which passes the scanning device (transceiver 12) is non-powered; thus passive. The passive device information can be retrieved by placement of scanning devices (as a single unit or a transmitter and associated receiver) which transmits an identifiable radio frequency signal 96 separate from other identifiable signals and receives a radio frequency 1 response from the passive device. This is attained requiring no power on the passive device and requires power and a connection only to the scanning device (transceivers 12) in order to give an identifiable signal response.

There is a first transceiver 12 in a room 94 and a second transceiver 12a in a second room 95 separated by a door 9. A camera 68 and an alarm 20 are controlled by a CPU 3 which is wired to these devices. The transceiver 12 and 12a communicates with the CPU 3 through a wireless connections 94 and 99 connected to the transceivers 12 and the CPU 3.

Identifiable signal responses are responses which have characteristics which allow the particular sensor in question to be distinguished from a plurality of other similar passive transponders, here passive device 33a sending out either a common signal or other independent signals separable by a CPU 3 or 72 so that a model may be generated showing the position of passive sensor transponders means (passive device 33) by virtue of their proximity to particular transponders.

Properties in related technology in conjunction with RFID technology (the disclosed invention) provides movement tracking of an individual or object in real time or historical tracking. This differs significantly from existing technologies as it provides visible and recordable movements of individuals or items as they pass through a mapped out area or facility. Strategic placement of the scanning devices allow for proximity notification throughout an entire facility as opposed to strictly tracking exits, doorways, or sensitive corridors. The system is not limited to or restricted to an entrance/exit scenario but rather can scan areas configurable or focused by the user setting up the system to accommodate each installation.

Passive devices 33, preferably sending separate distinguishable signals simultaneously or sequentially in response to different signals from the transceivers 12, are attached to the individual(s), here a first person 120 and a second person 121 and/or object(s) in a manner described below for different embodiments which provides for specific, distinguishable results.

One part of the transponder attached to the individual, here passive device 33, in the preferred embodiment, is a holding means, loop 30 for holding a transponder to a particular object or person, here to a users ankle.

The holding means is preferably one which provides for an interruption or alteration of the transponder signal where an alternating event, not expected, is received from the passive device 33 (transponder device) by the scanning device (transceiver 12), particularly in the event that the loop 30 is broken.

In the embodiment shown in FIG. 3, the transponder circuit is created by virtue of a loop 30 which the loop may carry one or more wires which complete the circuit, here when plug 31 of the loop 30 goes into the plug 32 of the passive device 33. This loop may go around the ankle or wrist of an individual or within the clothing of an individual.

Devices can be attached to objects in other manners allowed by the physical object where tagging is required.

Another example would be to have a magnetic circuit as is shown in FIG. 5 which would allow for the transponder in question to be attached to a metallic object and the metallic object would create the circuit between a first electrode 36 and a second electrode 37 on either side of the plate 35 (FIG. 4).

Since it might be desirable to have this type of alarm based circuit with a nonmetallic side 39. Another method would be to have a plate 38 attached on one side of the nonmetallic side 39 and have, on the opposite side the passive transmitter, passive device 33, in order to create the same type of alarm type circuit as shown in FIG. 5.

In FIG. 5, instead of the two electrodes, a metallic stitch 57 carry the current from the device through the side 39 in order to create a circuit for the passive device 33 through first electrode 36 and second electrode 37 which is broken if the parts are separated.

Another method of doing this would be to provide a seal 40 as part of the circuit loop 30 so that if the seal was broken, opening the device along the opening 42, the transponder, passive device 33, would return an unexpected echo to the scanning devices which, connected to the system, can trigger an alert due to the type of signal (reduced), lack with signal because of breaking loop 30 which is made as a part of the antennae or inappropriate signal response because of the breaking of a circuit described in the passive device 33 according to the design selected by the user or specification of the devices 33 used as shown in FIG. 6.

Figure 7:
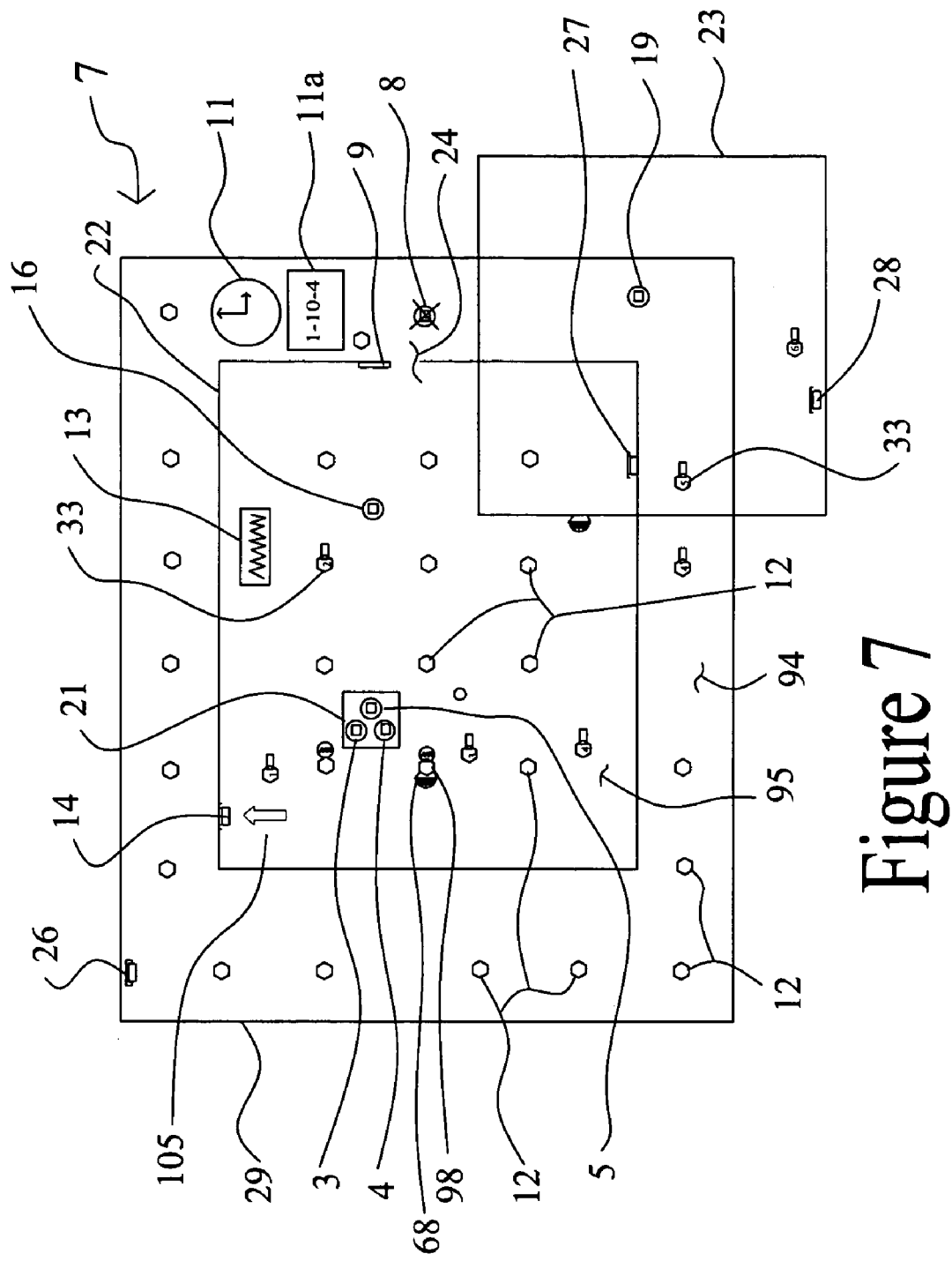
FIG. 7 shows a layout of a facility utilizing a plurality of passive transceivers on individual products in conjunction with the monitoring station and various telephone type monitors.

FIG. 7 shows an activated sensor 8 indicating such a problem on a screen. It also shows a special sensor, here identified as an active transmitter 19 which is an active or passive radio frequency device which is constantly or independently broadcasting by design or because of an alarm event such as the breaking of a loop 30.

Figure 10:
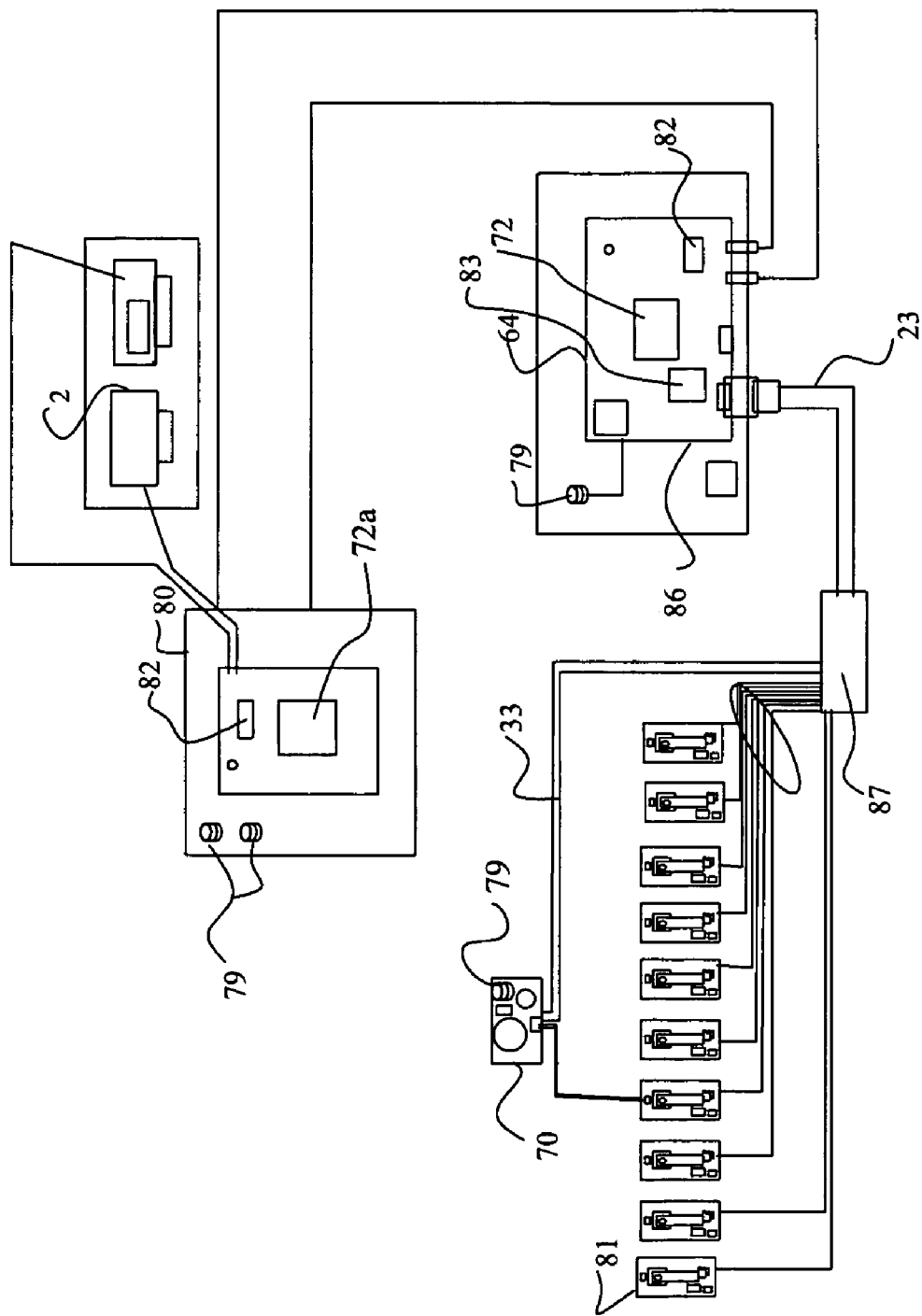
FIG. 10 shows a telephone system for the type which would be used in conjunction with the embodiment taught herein wherein the telephone system has a transceiver connected or as part of the circuit board of the telephone.

In terms of a process (referring to FIG. 10) the invention can be described as providing one or more storage units (hard drives 79) connected with one or more CBU CPU's 72 may or may not be connected over a local area or a wide area network with drives 79 capable of holding object or marker identification data, specialized data related to whether certain triggering events have occurred either to the passive unit or relative to the environment of the passive unit and also may included condition sensors (such as radiation sensor 16) sending various conditions (light, radiation, visual, sound, voices, temperature, time, etc.) around the area or areas (here rooms 94 and 95) where the units are in place from a group of conditions comprised of temperature, time, number of people and inventory available (along with their relative location and abilities), noise level, light level, and the like. This can be done by having active pulsing sensors (transceivers 12) in conjunction with passive sensing, passive devices 33, as shown in FIG. 7.

The information would also include information related to the transceiver location in a given environment, such as it's location relative to a map of the area involved and would be associated with a specific time period so that the movement over time would be determined within the database based on when the sensor response is received.

Expected patterns of movement might be utilized in comparison of the actual data in order to determine whether aberrational events or non-aberrational events were occurring. Observation and a determination of what should happen could be used to determine what the pattern of movement should be.

In the preferred embodiment, the sensors would be placed so that approximately sixty feet or less between sensors exist so that a passive marker is always within a distance that efficient and effective tracking could be maintained.

The method may be described as determining an area to be covered or alternatively allowing an area to be covered, defining parameters defined by users, and monitoring the movement by the scanning of the passive transmitters (passive devices 33) on the objects. A determined area may be divided by transceivers 12 of the type which are defined herein.

Algorithms operated on centralized computer programs at the CPU 72 are in constant communication with the sensor transceivers, and are used for determining the positions of the passive transmitters relative to the sensor transceivers based on periodic pulses sent out by the sensor transceivers and the accompanying reply from the passive transmitters referred to as passive devices 33.

There are two methods by which these algorithms may operate. One is to utilize software to determine distance of one sensor transceiver from one passive transmitter.

The other way would be to utilize triangulation to determine the position of a passive device 33 to more than one transceiver 12. FIG. 2 shows how a transceiver 12 may have a first antennae 100 and a second antenna 101 on either side of a transmitter 102 to provide limited triangulation of the signal from the passive devices 33 and 33a or to send different types of radio frequencies.

The space may be defined by the location of transceivers. In one embodiment, transceivers may be connected with phones or used as an addition or part of a specialized phone system or other monitoring equipment so the person or device monitoring the telephone may allow under certain defined circumstances for the phone or other device to react to the predetermined circumstances. Those predetermined circumstances may be defined for particular products. The data from a phone 81, camera 68 or other device (see the discussion of FIG. 12) may be added and associated with time and with the other position data, including the location of the phone, camera or other device relative to the device 33 or combinations of multiple devices 33 and 33a.

These sensors may have interference determining devices here radiation sensor 16 so that in the event that there is a radiation source 13 providing an interfering signal, the transceiver 12 would wait for the interference to stop or provide alternative wave lengths not affected by the interference before the transceiver 12 sends a pulse to the passive transceiver (device 33) in the area.

Transceivers 12 may be shown as shown in FIG. 7. They may be identified by their location or type.

Figure 12:
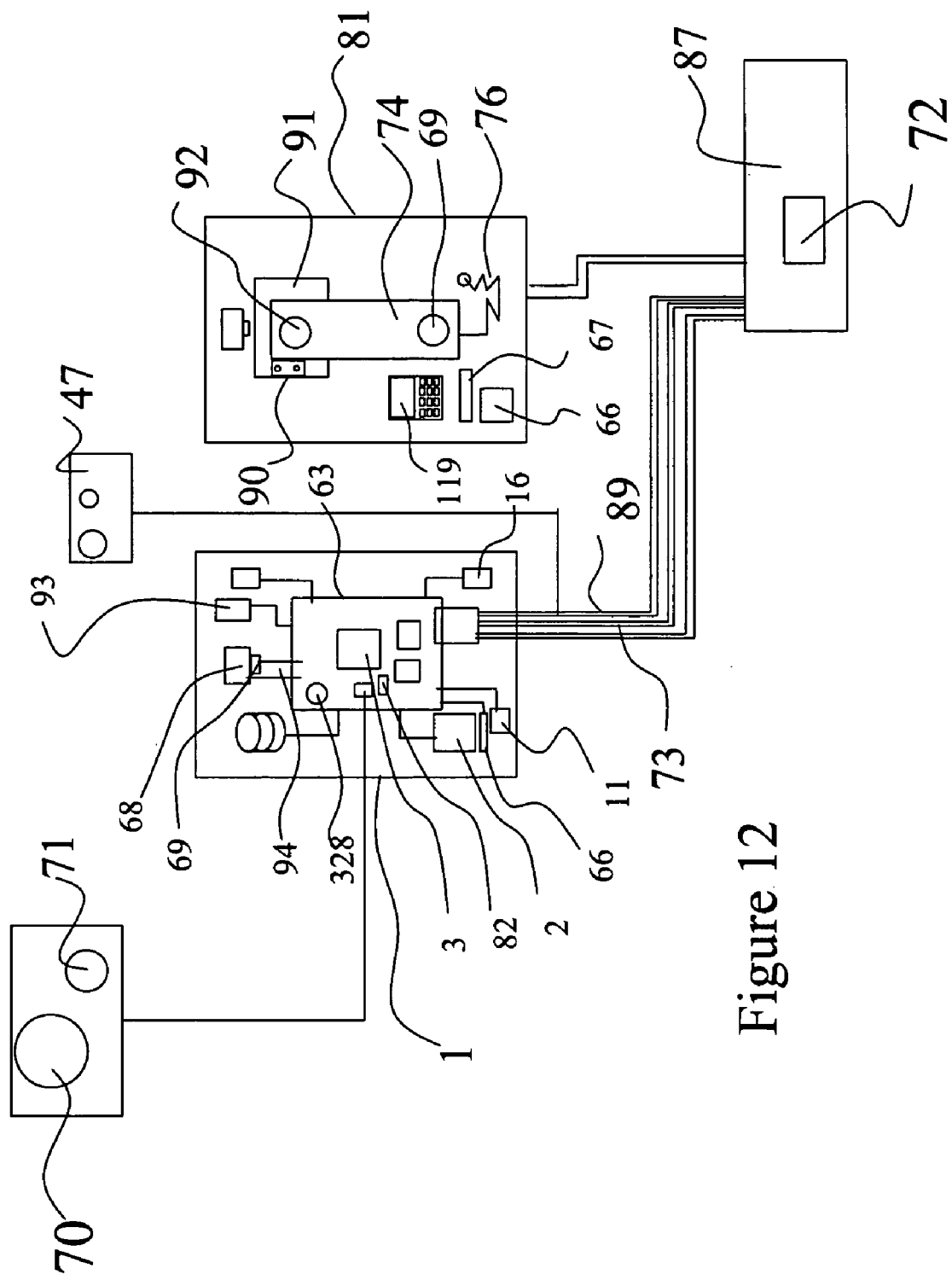
FIG. 12 shows a specialized phone for use with the process taught herein.

The next step is to determine a plurality of responses which may be stored in a database. Response types may be active response types such as alarms, lights, lock downs, or may be passive such as notification or monitoring. Monitoring might start listening devices or recording of information particularly in conjunction with specialized phones providing for this type of monitoring when in use as shown in the discussion of FIG. 12. At least some information is expected to be recorded in response to certain specific sensors in certain embodiments other than the movements of the passive devices throughout the facility.

In order to understand this better, it is important to look at certain circumstances wherein the invention is utilized as described in more detail below.

One part of the device is receiving responses reflecting the location of types and in some cases specific passive transponders (devices 33). The received information, not only results in one or more response but the information is stored in conjunction with specific times and in conjunction with specific events. This allows for historical records to be maintained and for the recreation of specific events for purposes of record keeping and for evidentiary purposes.

This can also allow for monitored separation of individuals showing an indication that he or she is in an area (e.g. room 94) where the individual is not allowed by given permission of the facility or organization. The report may be given to a local administrator or end users operating the system remotely. This is part of the reason that the sensors may be connected with door locks 103, cameras, lights 68 (not shown) or audio reception and transmission devices. Alerts may be given and doors locked or closed to prevent or delay violators.

Information can be retrieved, displayed, transferred through multiple embodiments or media types for the purpose of later use for disciplinary action and implementation of actions at the discretion of the user which may or may not be for the purpose of a disciplinary action but as evidence or confirmation of location at a given time and date.

Identification would likely be accomplished by using software at the CPU 3 or CPU 72 to associate a digital signal (numbers digitized) broadcast from the passive device with identifies associated with these digitized numbers. Some of the particular identifiers which are associated with specific transponder type passive devices 33 include specific people where the person would be identified not only by their name but also by certain characteristics of the person. Those characteristics might result, in conjunction with the approach of the person to specific products or specific other people or even a group of nonspecific other people, with a particular response from the group of responses including: recording events, activating various recording devices, alerting third parties, moving products or displays associated with the user, locking doors, providing visual or auditory warnings which warnings may be different for different people, products, combinations of people and products or combinations of marked people, products and events (such as open doors added to specific people with specific products).

Also, particular products may be tracked using a similar method. Enhanced security could be provided in a retail environment if certain products which were expected to be in one area were found to be relocated to another area under circumstances defined by the user.

Figure 9:
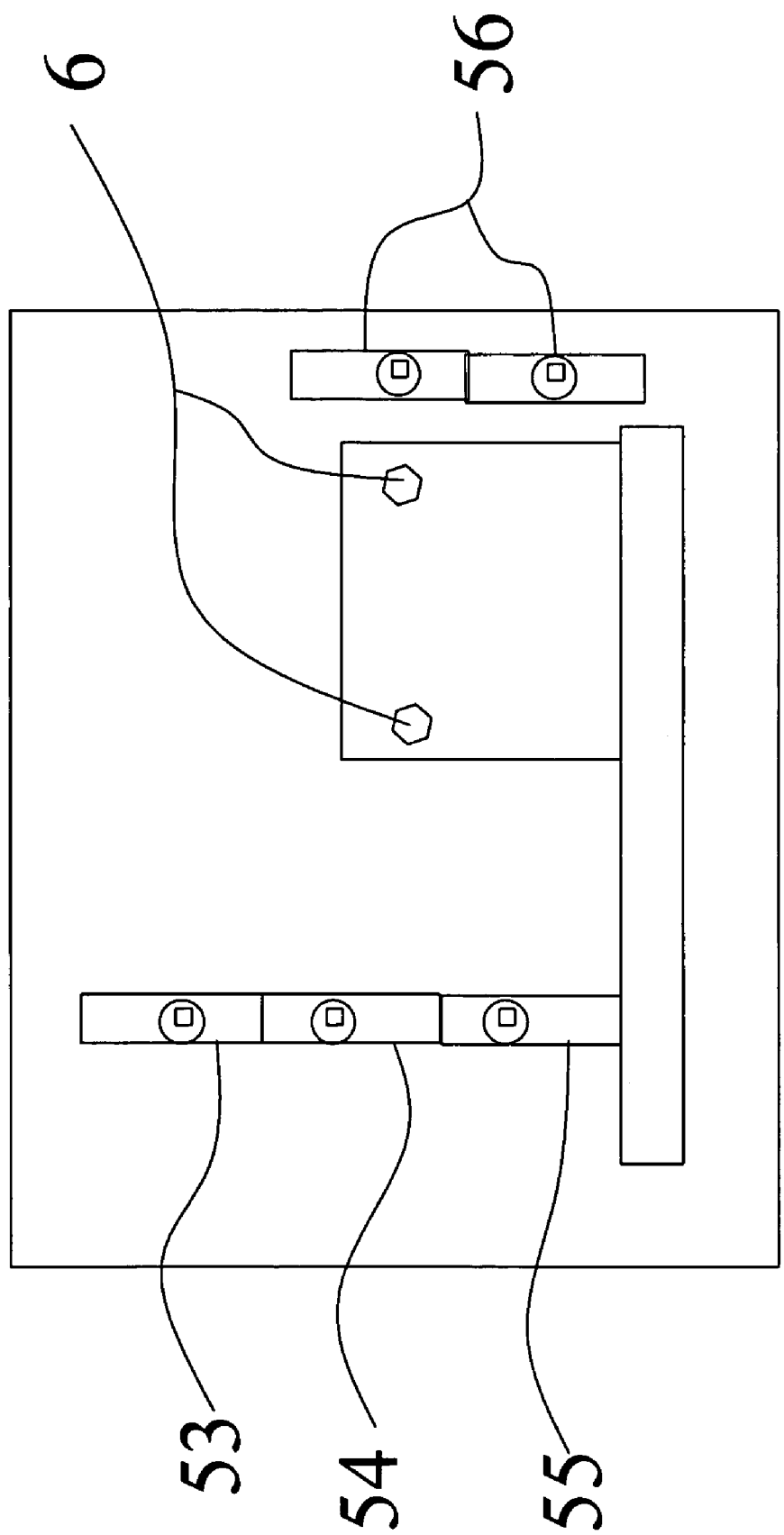
FIG. 9 shows an alternate embodiment to the embodiment shown in FIG. 7.

Another example, shown in FIG. 9, of how this could be used would be with assembly line products where particular types of products 53, 54 and 55 could be tracked to make sure they were put in the proper sequence. For example, if a car were being constructed, certain parts would need to be in certain quantities and in certain locations during the production process and would be expected to accompany a particular product as it moved down an assembly line. Here excess parts 56 are shown. Spaced sensors, transceivers 12, allow for triangulation or narrowing down of location.

If there were not sufficient product (53, 54 and 55) or if they were not in the proper place in connection with the use of invention, notification or a slowing of the assembly processes could be initiated.

This could also be utilized in an industrial site where, for example, pipes had to go in a series so that particular pipes could be tracked and counted as they were put down into a drill site or as they were aligned for other purposes.

The movement of inventory and assembly lines may be tracked for quality control purposes in order to maintain certain speeds or in order to provide that problems with shortages and slow downs are minimized because the data is associated with a clock 11 as shown in FIG. 7. A real time clock 11a is also shown.

In a hospital environment, particular drugs or material (sponges 41 in this example) could be tracked by rooms 44 and 46 and a hallway 45 so that if a used sponge 43, which would show, potentially a different signal by breaking a loop 30 to access it, made it into the wrong location (such as leaving with a patient or not reappearing at the close of an operation), alarms could be sounded to prevent misapplication of items. Similarly, for security reasons, particular products or particular equipment could be monitored so that if it moved outside of a particular area, its location could be located within a building or within a complex. Also, by associating with a particular person, the tracking of equipment in and out of a complex or products in and out of a complex could be associated with particular persons automatically and recreated historically.

Figure 8:
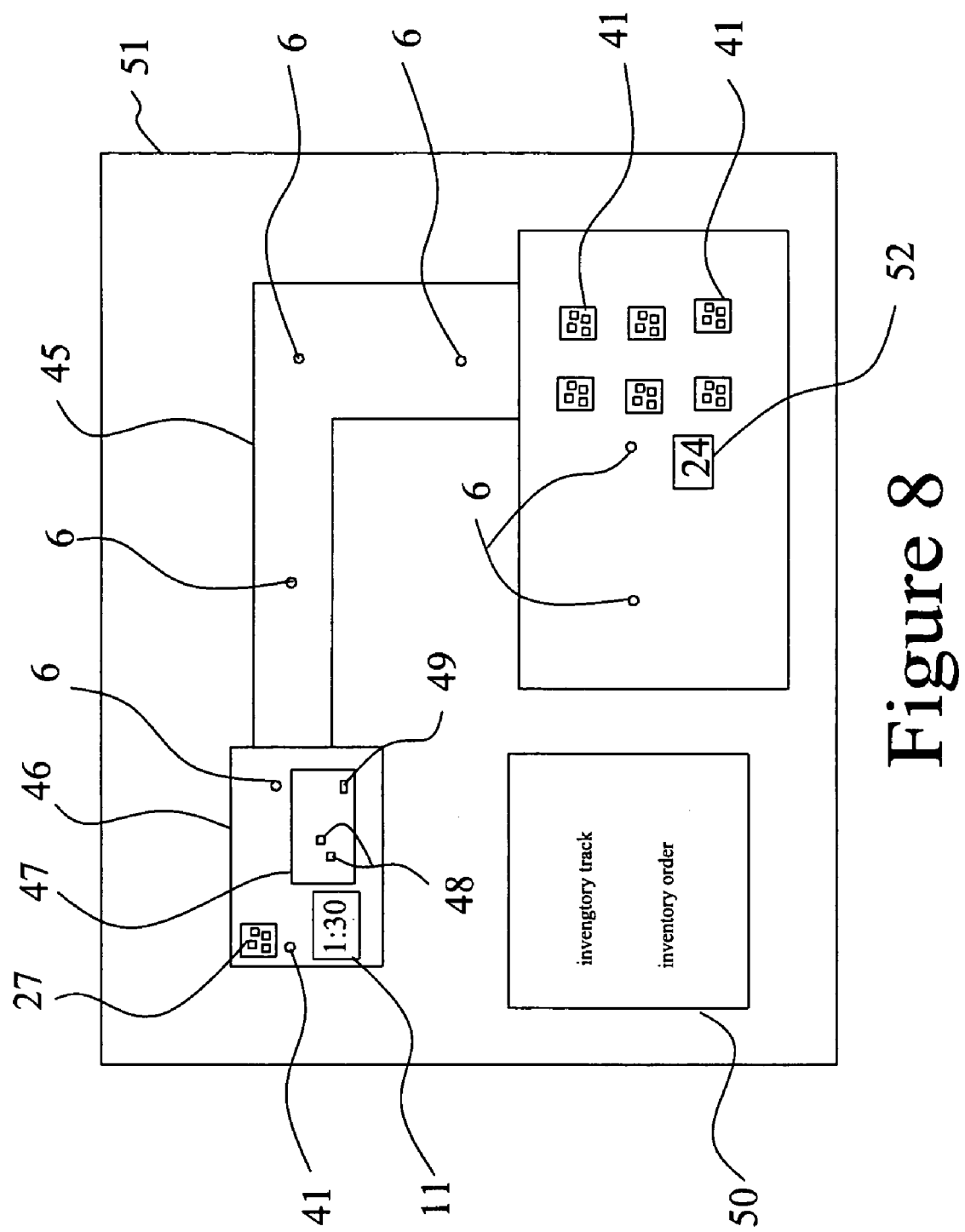
FIG. 8 shows an alternate embodiment of the embodiment shown in FIG. 7.

In FIG. 8 "activated" or used sponges 43 are shown separated form a grouping 41 at a table 47. If the table 47 with a monitored patient 49 moves without all sponges 43 being accounted or moves without the sponges 43 going to a specified area, an alert could be sounded as by showing the display (screen 51) from FIG. 8.

Real time tracking can also be used to insure there is not an instance where sufficient product exists or if said products were not in the proper place; or moving in such a direction that would ultimately lead to product residing in an incorrect location. Accomplished in connection with the use of this invention and possible expansion with digital web and phone systems would be the order of systems and the inventory control area 50 of the screen 51.

While in this embodiment, the placement of all of the items is precise, items could be indicated by a number 52 which number 52 here is the number "24" shown in conjunction with the closest sensor 6. Each passive device in FIG. 7 is preferably associated with a number which numbers may correspond to a legend which may be displayed in response to a mouse command over the particular device in question.

One advantage of this method is to save monitoring time and allow one person to monitor a larger area. In one case for example, the monitoring of certain locations would only be triggered by certain products triggering the sensor in that location. While monitoring could manually be activated in any location, the presence of one or more passive sensors in that area could automatically activate monitoring. Also monitoring may be shifted, as at night, to remote cpu 72 covering a large number of areas which might otherwise be locally monitored.

In some cases, the monitoring only occurs for a short period of time, or varying periods of time depending on the type or combination of passive transmitters involved in the particular situation so that data is created without an extended period of monitoring to make more compact data records. Similarly, historical records might only be generated only under certain circumstances or even under GUI input. One major improvement over other monitoring is the use of coding of historical data to prevent tampering.

There may be different passive transmitter types utilized in conjunction with the invention. These passive transmitters may have different data imprinted on them or transmit different data including (1) identify data associated with people, types, broken seals or loops 30. Combinations of transmitter types or numbers in an area, area violations and monitoring issues are controlled by the CPU locally or at a remote location. Limitations may be stored in order to start or stop monitoring or enhanced monitoring with additional input devices (cameras, speakers 17 or microphones, independent microphones, speakers or cameras, etc.).

A database of proposed responses could be prepared and the notification and extent of proposed responses could grow in their level of severity. For example, in a prison situation, the collection of an unacceptable group of individuals identified by passive transmitters might initially result in monitoring or just the beginning of a historical data collection.

Thereafter, if a certain period of time transpired, the area in question might be lighted with regular light, special lighting or warning lights by interfacing with existing security or facility management systems. It could then progress to alarms and even isolating automated responses (lock downs). Likewise, notification could be sent out at different levels and to different people at different locations and different levels based on time and severity of the programmed data responses to data, i.e. the pre-programmed interpretation of the data. Events could be separately timed so, as shown in FIG. 8, the sponges in use have been present for 1 hour 20 minutes on clock 11a.

In this way, the automated system in the event for example of a riot in a prison system, might initially determine a riot type collection and or movement of identifiers associated with inmates at one level and send the data just to the internal security, but the CPU 3 might automatically relate that to external security sources via CPU 72 after a period of time or based on escalating events (e.g. an absence of movement by units with passive devices, disconnection of passive devices, grouping of units with passive devices, units action outside prior patterns, etc.) in order to ensure that proper notices were given out.

By associating this information with the telephone equipment which is described in more detail herein, it would be possible to allow for the telephone equipment to do the monitoring at particular locations and for the smart phones described (FIG. 12) to send outside responses.

This would be particularly helpful given the prior existence of these types of telephones at locations within a shopping center or prison. In other embodiments, the phones could be replaced with cash registers and the tracking could be tied in with the inventory management systems run on the cash register systems.

If a certain number of items appeared at a cash register and the sales did not correspond to the movement of the items in question, an alarm or notification could be created.

If certain circumstances indicated that events of that type required monitoring, then the telephone system could go off-hook and the cameras could begin monitoring the transactions.

Similarly, products or individuals when in directions other than those which would be expected alarms, notification to security or recording could be triggered.

FIG. 7 shows a layout which may be displayed on a monitoring screen of a facility utilizing the technology. Passive devices may be individuals, products or both. If this were in the shop portion of a prison, the movement of certain tagged items (weapon materials for example) within the shop could be tracked in order to prevent those items from disappearing or from being misused in the wrong locations.

Since the sensors may be embedded in or mounted on tools. This would provide a method for ensuring that no tools were removed from the site without notification. The disappearance of a particular item due to damage of the sensing device would alert the facility by providing a special indicator showing the last location where the item was known as well as historical data related to the monitored people who had passive devices who were close by or actually utilizing the equipment at the time.

Some individuals might have active transceivers in place of the passive one or in use in combination with the systems taught herein to provide constant superior information and superior range.

Under certain circumstances, the time frames would vary in which the sensing equipment was activated. Because of some environments, for example facility infirmaries, the sensors may interfere or receive interference from certain types of equipment, transceivers 12 may be equipped with radiation sensors which detect conflicting radiation and wait to pulse until the offending radiation dissipates. This can be accomplished by the scanning devices receiving a series of erroneous data which cannot be matched with any existing record in the database, thus appearing as interference or inaccurate data.

While this particular method might allow a sophisticated user to turn the system off for a period of time, for most purposes, this is not considered to be a problem since the system can detect and interpret aberrational events of that type in order to create a high sense of alert which might not otherwise be present.

As can best be seen in FIG. 7, the screen displaying the information either in real time 24 or historically would include a time date stamp with an incremental counter for duration data, clock 11a and a time clock 11 (with or without a calendar) for real time comparison could exist, and could also show the position of various sensors at different times, including sensors with specialized information such as the smart phones which could have their own local CPU 3 and/or be tied in with a remote CBU CPU 72 as shown in FIG. 12 where the phone is connected with a transceiver 12, in this case, a camera 68, and a speaker 92 and microphone 69 (here part of the handset 74) to send or receive sound information. By selecting with a mouse printer 105a particular icon (here phone sensor 14, one of the transceivers 12), the information at any given time received by that sensor 14 (either by designation by the user or by automatic response of the smart sensor as a part of the network or as a result of action for the sensor's internal CPU 3) could be displayed in order to obtain additional information about events in that area.

On display 7, a number 1, 2, etc, may be displayed along with a more detailed legend if deserved for each passive device 33.

A different symbol is utilized in this example in order to show non-compliant individual who was marked but who was not identified by the sensor or whose sensor is damaged as by disconnection of the loop 30 or seal 40 (here activated sensor 8). This designation could be eliminated electively by telling the CPU to activated sensor 8 readings or other designations from the picture to eliminate clutter. While a single type of activated sensor 8 is shown, different types can be displayed using this concept as by numbering the activated sensors with a legend as taught with the regular sensors.

In this situation there is also at least one phone sensor 14 within the outside area 26 and inside area 22 a non-monitored area 23 with a normally unmonitored phone 28. These phones could be designed to operate much like the other sensors shown and in this case the phone may be made to actively monitor as a transceiver monitor retrieving sound and visual data in the preferred embodiment in the event that a triggering event occurred. In the case of the smart sensor or in the case of the hardware, all sensor data may be monitored constantly or may be monitored only when selective events occurred in order to decrease the amount of data which was generated for later use. The phones might not have their own sensors, but may be triggered by a common computer by other sensors. Examples of these events are given throughout this document.

The transceiver 12 may use different RF signals to trigger different passive devices 33 in order t or decrease clutter in sending or reading retain signals. The CPU may control according to a preset plan how the different RF signals sent and how often each signal is sent in conjunction with expected parameters of movements, etc.

These areas may be separated by walls and the lines that represent walls or they may just be different zones for purposes of triggering events.

In this example, area 22 has at least one door 9 and an opening 24 in the wall and locking this door may be one of the active responses to particular circumstances. There is another outer area 29 which could be a wall, a fence or just a designated area.

For example, the point of the sensor's work is to determine alarms, such as fire alarms, could trigger the opening of certain doors or other audible noises associated with the alarms as could the approach of individuals or individual objects towards the door cause doors to be locked or alarms or notifications based on the nature of the object approaching it. This prevents unauthorized exit of an area divided by separation devices such as cell slide and lock doors, magnetic retaining doors, magnetic or auto lock doors, and other electronically controlled equipment which has the potential to interface with the tracking system of passive devices 33, transceivers 12 and CPUs 3 and 72.

Just to give one example, at a sports facility, members may be issued cards. Individuals with cards might only be able to enter authorized areas or injured individuals or persons requiring attention in the case of a rehabilitation center can possibly be detected based on historical data compared with real time data dynamically and actively by the system. Lack of motion can be a good indicator of abnormal behavior under given circumstances.

In this case, there is one non-compliant individual shown by activated sensor 8 who is outside of the normal grouping. Knowledge of where one group of individuals may be significant. For example, if it's known that a guard is in proximity to a potential problem in a prison unit, then that guard's presence can be set out by the device and a nearby phone may notify them of an event within that guard's jurisdiction which the guard may either want to go towards or move away from depending on the notification whether it be a positive or a negative event.

This system is designed to provide data back to the end user displaying any and all motions of any and all items selected to be tagged by the facility or organization. The purpose is to introduce a method of observing motion of tagged people or equipment, log the data, and respond and display the data accordingly and as requested by the operator of a CPU 3 or 72.

The invention is taught with a telephone system having unique monitoring methods and equipment to allow the user to following conversations and retrieve portions of the conversation. The CPU and GUI allows users to take certain actions in connection with conversations. The monitored event may have multiple phones in conjunction with multiple sensors and other devices. The first part is a novel grouping of elements for greater efficiency, lower costs and convenience. The second part is a method of manipulating data and interacting with the novel grouping.

There may be two groups of users within the system, the first being the maker and recipient of the call and the other being a person or device monitoring the call.

Several main components are required to form the telephone apparatus. One component is the phone system installed at a facility to provide access control for the telephones located there. The phone system of the facility operates in conjunction with a central office operated from a remote CPU which may be remote from the facility, hundreds or thousands of miles away. The central office may handle many such facility phone systems. Another components is one or more computer workstations (local CPU 3) located at the facility. This is typically a PC-based apparatus with a variety of tasks, primarily in the nature of an interface. A recording system is another of the main components. It may be located remote, in the facility or both as taught by having remote CPU 72 and local CPU 3. In this embodiment, the facility accommodates the workstation, phone system, recording system and the file server with mass storage 58. These are all networked together. The workstation CPU 3 is utilized as an interface to the sensor/telephone system to enter data for controlling access by the telephone, and individual users thereof, to the local CPU 3. The CPU 3 is also an interface to the recording system (hard drive 79) in order to control which phone conversations are recorded. In addition, the local CPU is utilized to retrieve data from the mass storage (hard drives 79).

The remotely-located central office provides a variety of services for the facility. The facility phone system and the central office remote CBU CPU 72 are in communication through the local CPU 3 by modem or through a direct wire. In either case, a connection between the central office and the facility phone system can be made as and when the need arises through local CPU 3.

The data may be separated so that monitoring data and call data (originating digital data, ring and voice data) may be analyzed separately by a data separator means. The call data; (phone numbers, PIN numbers and other data generated initially in a digital format; may also maintained separately from the voice data) but is cross referenced with the voice data.

A GUI (graphic user interface) as discussed above is utilized in order to generate data from which the comparisons are made.

The device may also include an options data base, also entered by GUI, containing a pre-selected group of options from the group of options comprising terminating the call, marking the call with a marking means for associating a marker identifying the ring type with an identified group, playing a recorded message in conjunction with the call, forwarding the call, monitoring the call, storing the call in a data base with the marker, or related actions in communications with an output means (such as door locks or cameras or alarms) for effectuating the response from the group of options outlined above.

A voice comparing means may be used where key words or phrases or tone numbers are analyzed, (as opposed to ring types or other signals, dial tones, background sounds, etc.). The system may include, as a part of the CPU 3 a data generator for associating telephone communications with call preselected data from a group of data comprising start time, finish time or length.

An options database holds options for various words, numbers or DSTM signals containing a pre-selected group of options for a particular word type or data entry from the group of options. The data may be modified by marking the call or the word within the call data. The mark may be made with a digital or analog mark corresponding to the data type (preferably digital data) to associate a particular mark identifying the ring type or word with an identified response.

The call/sensor may be modified by terminating the call or monitoring, playing a recorded message in conjunction with the call, forwarding the call, monitoring the call, telling the controller to store the call in a data base with the mark, etc.

One set of responses may be to encode and mark the data as described above or to encode the data with an encoding means. This may also be handled by the local CPU 3.

A voice data base may be in storage (hard drive 79) which is connected to CPU 3 including a prepared list including specific identifications, words, area code, geographic location of called number, name list (last, first, etc.) number of the user, dial tones type, telephone number, number of rings warning messages or combinations of these in serial grouping or within a certain time span.

Utilizing this or the other data the output means is instructed from a data base containing a pre-selected group of options from the group of options comprising terminating the call, marking the call for associating a data marker within the call data identifying the ring type with an identified group, playing a recorded message in conjunction with the call, forwarding the call, monitoring the call, or storing the call in a data base with the marker.

In this case, the output means for effectuating the response may include responses within an output options database which are sent by the GUI to CPU 3 or CBU CPU 72 from the list comprising alerting a listener, dialing a listener, storing the call for the listener, playing back a stored call, playing the call as it is received for the listener, giving at least some of the pre-selected data on the call to the listener (who is not one of the primary parties, caller and person called), conferencing the call to other listeners, and encoding the call either in response to the GUI interface or automatically.

The encoding means, is further described as an electronic computing system for use in the monitoring and tracking of telephone communications over which users can communicate by means of spoken or GUI commands comprising encoding the call data so that changes to the data make changes from the group comprising: changing a numeric sum based on the data or marking the data to show the change.

The step of encoding comprises the steps of (1) taking the digital data pack (including start and finish numbers, location, pin number, digitally converted analog conversation/rings, etc.) running an algorithm to select the numbers according to a preselected formula, determining a mathematical equation based on the manipulation of selected numbers from the group comprising (sum, subtraction, multiplication, division, integration, encryption, etc.) according to the selection.

This would work along with the data bases as described above containing a pre-selected group of options for a particular PIN number (or biological marker) from the group of options comprising terminating the call, marking the call with a marking means for associating a marker identifying the ring type with an identified group, playing a recorded message in conjunction with the call, forwarding the call, monitoring the call, storing the call in a data base with the marker, etc. and the output means for effectuating the response.

The phone-related data is used to determine whether the telephone is active so that a call connection can be made, independent of the particular inmate that is placing the call. Thus, it may be desirable to have a particular phone, or a group of phones such as those in a particular cell block, controlled so that calls or off hook data readings can be placed/received therefrom during certain hours of the day and only on certain days (e.g. days of the week, weekends, holidays). Moreover, a maximum duration for each phone call placed from that phone can be set so that a phone is not monopolized by one call.

When it is desired to retrieve information CPU 3 is utilized for this purpose. Such information can be, for example, in the form of a report or it can be a recorded phone conversation. Examples of reports that can be provided are those sorted by any one of the following: origination number, destination number, PIN number, frequency, call duration, and group of phones (e.g. by cell block). The information included in the report in the report is that used for sorting and any and all other call data fields that are available by virtue of having been stored.

The applicable search parameters are entered into CPU 3 to form a request when retrieval of a recorded phone conversation is desired. Each phone conversation (whether a phone call or monitoring of events from passive devices) is stored along with any or all of the call-related data, and possibly other data, and the search parameters that can be used correspond thereto. This includes the passive device ID's origination number (i.e. the telephone number from which the call was placed), the destination number, the PIN number, the time of day and the day of the week, the date, and so on. The search request, as based on the search parameters that are specified by workstation 219, sent to the file server CPU 3 which carries out the search through the conversation data that is stored if received.

A report of all of the phone conversations that fit the designated search parameters is prepared by the file server and can be called up for display by CPU3. A decision by the operator can then be made as to which one of the listed conversations is to be played back.

Steps in the process include:
(A) creating at least one circuit board;
(B) connecting the readers to the circuit board;
(C) selecting the most efficient form for transmission of the data of each data type;
(D) converting the data to a digitized forms corresponding to the efficiency determined by having wave type data converted into digital signals which are given a services of values (0 or 1) as a bit;
(E) storing data which is not ready to send;
   (I) determining the amount of data to store
   (II) prioritizing data to be stored
(F) determining the size of bytes containing the individual bits of data for each data type;
(G) packaging the bytes to be sent
(H) attaching at least one time reading to each data byte made up of digital data bits.
(I) attaching a time reading for at least one predetermined period which time reading may be separated out (as a separate byte) to allow a remote clock to keep in time with the local phone clock;
(J) streaming data into bytes in association with the time marker into a transmission stream along with an identifier identifying the type of data being sent by;
   (I) the format,
   (II) attaching an initiating multi-bit or single bit identifier,
   (III) ordering the data;
(K) retrieving the data out of the data stream;
(L) separating the data by type based on the identifier
(M) maintaining the data with the time marker for at least one data type;
(N) using the time marker to maintain the time order of at least one form of the data for later transmission and alignment of different data types;
(O) determining the best method for transmitting data; and
(P) sending the data by at least one, and preferably a plurality, of transmission data streams separated by priority where necessary to maintain the stream whether the priority is set locally, automatically, or remotely to the sensor, the local CPU systems or a remote CPU system.

The method claim can be altered so that the step of streaming data includes multiplexing the data by determining the amount of one data stream required while still allowing an other data stream;

Using several frequencies on the same channel to transmit several different streams of data from different readers, simultaneously is also within the modifications possible with this system;

Providing multiple streams of data which streams of data include different sampling locations for different types of data assigned to a particular location on the data stream to ensure that enough data is transferred from each separate source.

Referring to FIG. 2, it can be seen that the door (c) controlled by locking mechanism (d) may be designed not to open in the event that the sensor determines that a certain individual is present and the visual alarm (e) and camera (f) may also avert and or monitor progress of the particular prisoner as he moves through the system from the monitored location (a) to the location monitored by phone (b).

The doors may be monitored as shown in FIG. 2 and as described above so that the monitoring mechanism shown can be replaced with a detecting mechanism so that when doors are open, certain responses such as increased monitoring or a combination of monitoring can occur.

One of the benefits of the technology described herein is the transition from a lock down embodiment through the various stages of release.

Because of prisoners are typically electronically tracked, there is not a significant amount of additional work that is required in order to utilize this system as the inmate moves from one area to the other.

The bracelets can typically be removed by prisoners on home arrest and this causes significant problems in tracking which the present system can, to some extent either rectify and or minimize.

In addition, mistakes and transitioning of prisoners can be prevented since alarms can be sounded as a prisoner without proper clearances is moved from one area to the next in forming the handlers of a potential problem with the prisoner.

Figure 11:
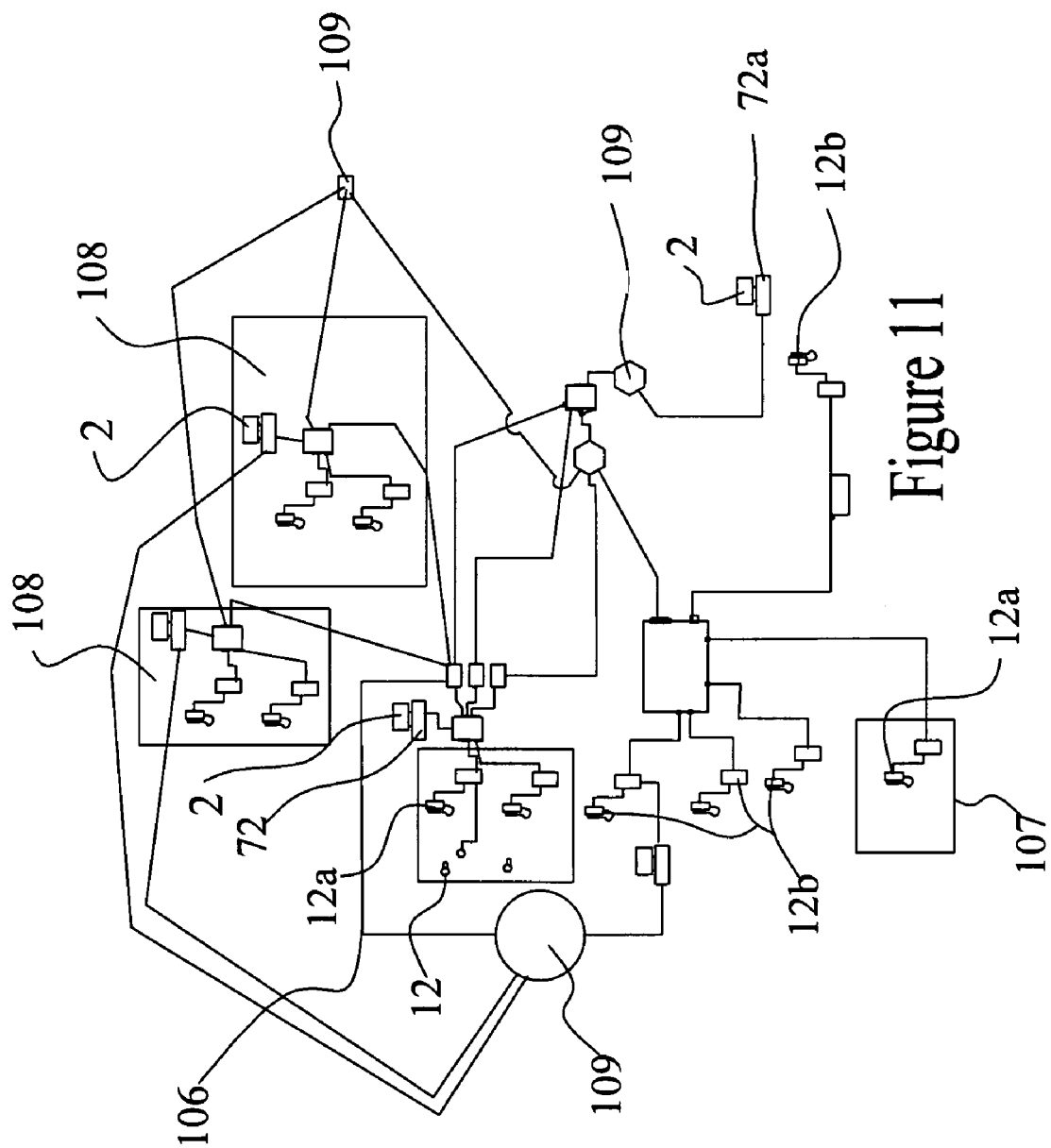
FIG. 11 shows how the telephone monitoring system may be used in conjunction with several areas utilizing different phone systems tied in together to a central monitoring station.

Referring to FIG. 11, it can be seen that the prisoner would start off on at a monitored facility area 106 with phone transceiver 12a (as described above in reference to FIG. 12) and independent transceiver 12. The inmate may then move, if allowed, from the monitored facility 106 to the home area 107 utilizing a single phone transceiver 12a.

The transceiver 12 on the phone 12a as shown will when the prisoner gets to the home area 107 take pictures.

As part of the system, the phone may automatically be programed to ring at certain time intervals if the prisoner is not seen in the camera 68 within a set period of time so that he may answer the phone, be photographed and thereby ascertain his presence.

Monitoring may be consistent at the remote CBU CPU 72 or it may be moved to a remote CPU 72a unconnected to any particular facility through a telephone or WAN (wide area network) cloud 109 to other cooperating areas 108 may exist and the system can work with random transceiver phones 12b (like these in FIG. 12) at preselected locations so a prisoner can check in at various locations where these phones 12b are present such as work, courts, prisons, and the like. GUI (graphic user interfaces may be attached to CPU 3, CPU 72 or CPU 72a.

This system can also be used in order to monitor other activity within the house, both when the phone is off the hook and when the phone is on the hook through the automated process described herein and in the event that certain events are detected by the monitoring device.

Comparison software can be used in order to compare the photographs and or voice the individual received a monitored telephone of that which is preprogrammed and the phone camera can be placed at any appropriate location throughout the house. In the preferred embodiment, it is a part of the phone for purposes of minimizing the amount of equipment and home invasion required by the system.

A smart phone 81 may be used in conjunction with the method taught herein as shown in FIG. 12.

The CPU 3 communicates by way of direct attachment to the phone circuit board 63. The CPU 3 communicates by was of direct attachment to the phone circuit board 63 containing the processing chips which controls and communicates back to the CBU 72. The accessories (described below) are attached to ribbon cable 94 or mounted on the phone housing 65 by interface with the phone circuit board 63. In the embodiment shown the circuit board 63 is connected to a fingerprint reader device 66, a credit card reader 67 a digital information GUI (a number pad) 119, a first camera 68, a first microphone 69 and, in this example, a remote camera 70 and remote speaker 71. The circuit board 63 communicates with the CBU CPU 72 via the twisted wires 73. The handset 74 connects directly to the circuit board via variable length lanyard 76 located on the phone housing 65.

CBU CPU 72 via may receive may receive information from the transceiver 12 directly via line 89 or the interfaces (USB for camera and print data and the RJ45 connection cable for all other data including voice with a storage means. Hard drive 79, may retain the data transmitted from the print phone CPU 3 to the CBU CPU 72; ultimately ending up on a remote computer, shown in FIG. 11, with any specified storage medium (here hard drive 79). An API program or chip with program is running on the remote computer may handle communications from the CPU 72.

This storage medium in which received data is stored, driven, and accessed is processed and controlled by software modules. Different storage types would be more useful at different locations. For example short term phone RAM 82 storage may be more useful at the phone where only short term storage is required. The CBU CPU 72 could have ram and a hard drive 79 depending on the level of control required at that level.

In order to maximize reliability of the phone system, decrease maintenance, and improve performance, the novel phone uses a digital sensor 90 for an on and off hook signal by installing a magnetically sensitive digital sensor 90 (a non digital sensor could also be used) which is normally open [or normally closed programmable at the users discretion] in the cradle 91 and powered by the phone circuit board 63. The magnetic speaker 92 which is built into the phone handset 74, is read by the sensor 93, to determine the hook state of the digital phone system. The sensor 93 is read and communicates with the digital phone housing via connection to the phone circuit board 63 and the phone CPU 3 interprets the results from the sensor and generates the appropriate on or off hook signal from the phone CPU. The signal is sent over the data line to the CBU CPU and ultimately fed to the CBU API 83 for final translation and provides a "message" to any software module programmed to look for this message. The software module can then utilize the message in any way to provide the on/off hook data and handle it accordingly powering the handset speaker end receiver. This digital hook switch provided by the sensor 93 allows there to be no moving parts which are present on the traditional phone housings and improves reliability and removes mechanics which are a portion of failures encountered in field environments. The phone may also be electronically taken "off hook" for monitoring the phones or attached devices by designation from a remote processor such as CPU 72.

The local central processing unit, CPU 3, may be connected to any type of storage (item 179) to store data for any period of time in order to allow the remote user to acquire data which was not previously sent. Preferably this stored data would be sent to a hard drive as soon as possible to prevent loss at the local phone because of damage, overload, etc.

This data may be stored at the phone (local to the trasnceiver) for a period of time in order to lower storage requirements at the CPU 72 so the remote user can make a determination within the set period of time as to whether additional data may be required or not.

The steps of this process are:

1) Determining the types of data desired to create a data group from the group consisting of voice, picture, biomarker (finger print, retinal scan, etc.), card holder information (credit card number, name, personal information, expected locations, check in time frequency, quantity required, etc.), DNIS and ANI call data, etc;

2) Writing a protocol to associate the data types with a particular signal generated by RF signal pulse;

3) Adding a transceiver to receive the RF signal pulse;

4) Reading the data from the transceiver involving:
   (A) pulsing a request for info;
   (B) retrieving a response;

5) Compiling the information from the transceiver including the steps of:
   (A) selecting the most efficient form for transmission of the data;
   (B) converting the data to a digitized forms corresponding to the efficiency determined by having wave type data converted into digital signals which are given a services of values (0 or 1) as a bit for transmission and CPU;
   (C) storing data which is not ready to send;
   (I) determining the amount of data to store
   (II) prioritizing data to be stored
   (D) determining the size of bytes containing the individual bits of data for each data type;
   (E) packaging the bytes to be sent
   (F) attaching at least one time reading to each data byte made up of digital data bits.
   (G) attaching a time reading for at least one predetermined period which time reading may be separated out (as a separate byte) to allow a remote clock to keep in time with the local phone clock;

6. Streaming data into bytes in association with the time marker into a transmission stream along with an identifier identifying the type of data being sent to a remote. CPU;

7. Retrieving the data out of the data stream at the remote CPU;

8. Separating the data by type based on the identifier

9. Maintaining the data with the time marker for at least one data type; and

10. Using the time marker to maintain the time order of at least one form of the data for later display, transmission and alignment of selected data.

The method claim can be altered so that the step of streaming data includes the step of multiplexing the data by determining the amount of one data stream required while still allowing an other data stream;

Using several frequencies on the same channel to transmit several different streams of data from different readers, simultaneously is also within the modifications possible with this system; Providing multiple streams of data which streams of data include different sampling locations for different types of data assigned to a particular location on the data stream to ensure that enough data is transferred from each separate source; and Combining two or more signals into a single signal to transmit over a communications channel.

Because many varying and different embodiments may be made within the scope fo the inventive concept herein taught and because many modifications may be made in the embodiment(s) herein detailed in accordance withe the descriptive requirements of the law, it is to be understood that the details herein are to be interpreted as illustrative and not in a limiting sense.

We claim:

1. A method of tracking a plurality of items in a plurality of distant locations, comprising:
   providing a plurality of transceivers within each of a plurality of distant areas;
   providing a plurality of items with an active or passive device for generating a radio frequency (RF) signal with a signature capable of issuing an RF signal burst capable of identifying at least one of a plurality of items by way of the signature of the RF signal burst;
   determining discrete time periods for reading the RF signal; and
   generating the RF signal at the discrete time by:
      (1) requesting the signal;
      (2) reading a continuing signal; or
      (3) sending a pulse which generates the signal from a passive device for generating an RF signal burst in response to an RF signal; reading the signal at a receiver, sending the signal to a CPU means for providing information to a user in a graphic format showing the items differentiated by signal type and areas and showing items which are not of same items which are not functioning along with the last location historically when the items were located with or without other RF signals.

2. A method as in claim 1, further comprising combining each device RF signal with data in a database that includes identifying information about the item to which the device is attached.

3. A method as in claim 1, further comprising the steps of providing a plurality of Graphical User Interfaces (GUIs) and allowing the user to screen the devices by one or more of the plurality of GUIs.

4. A method as in claim 1, further comprising storing data along with the time of the reading.

5. A method as in claim 2, further comprising monitoring a plurality of said devices for activity.

6. A method as in of claim 5, further comprising setting events to respond to specific predetermined events from the group of responses consisting of reduction of number, increase of number, disappearances, movement, authorizing, and turning on nearby equipment.

7. A method as in claim 1, further comprising allowing passive devices to go into unmonitored areas for timing absent signals, notifying other monitored areas as appropriate monitored areas, and providing notice to the CPU of devices not returning to an appropriate monitored area.

8. A method as in claim 7, further comprising statistically labeling items with passive devices and sampling to determine if a statistical sample is present.

9. A method as in claim 8, further comprising setting specific amounts and determining if said amounts are equal to the specific amounts, and marking differences.

10. A method as in claim 9, further comprising changing the notice as amounts change in range.

11. A method as in claim 1, further comprising generating predetermined messages in response to expected changes for review by a user including ordering or generating a number of related items.

12. A method as in claim 1, further comprising providing at least one of said devices with a connector configured to allow multiple of said devices to be connected thereto.

13. A method as in claim 12, further comprising creating a circuit for the RF signal including an attachment means for sealing the device to the item.

14. A method as in claim 13, wherein the attachment means is a bracelet attachable to an individual.

15. A method as in claim 14, wherein the bracelet comprises a non-breakable means for altering the RF signal pulse if the attachment means is broken.

16. A method as in claim 1, further comprising:
   sending data on the pulses received along a telephone line connected to said receiver to a remote CPU associated with a database;
   storing the data in said database; and
   searching said database and displaying a profile associated with said RF signal burst.

* * * * *